April 1, 1930.  J. T. SHIMMIN  1,752,758
APPARATUS FOR SEPARATING SOLIDS FROM
LIQUIDS OR LIQUORS BY FILTRATION
Filed May 4, 1925   4 Sheets-Sheet 1
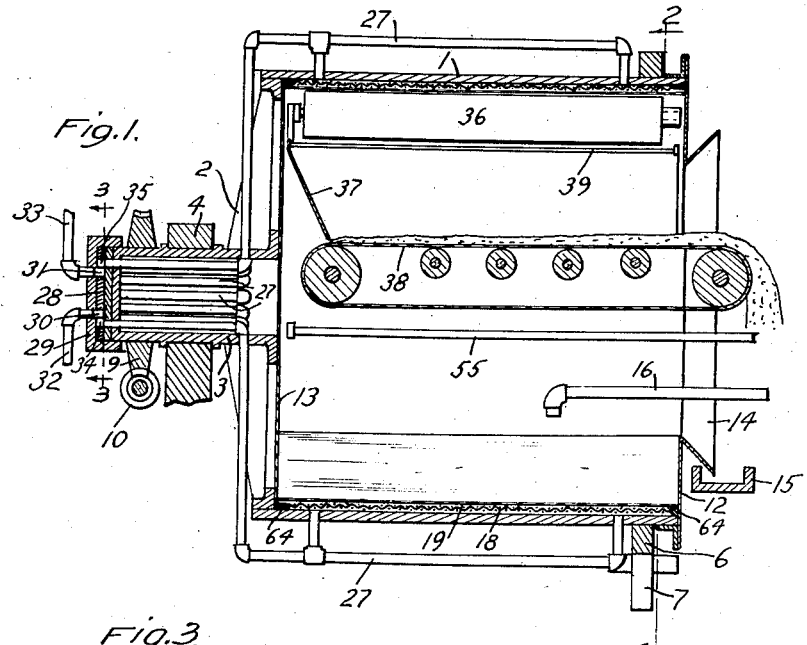
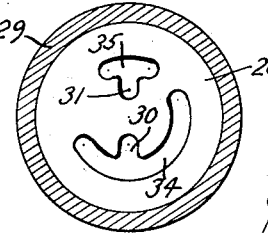
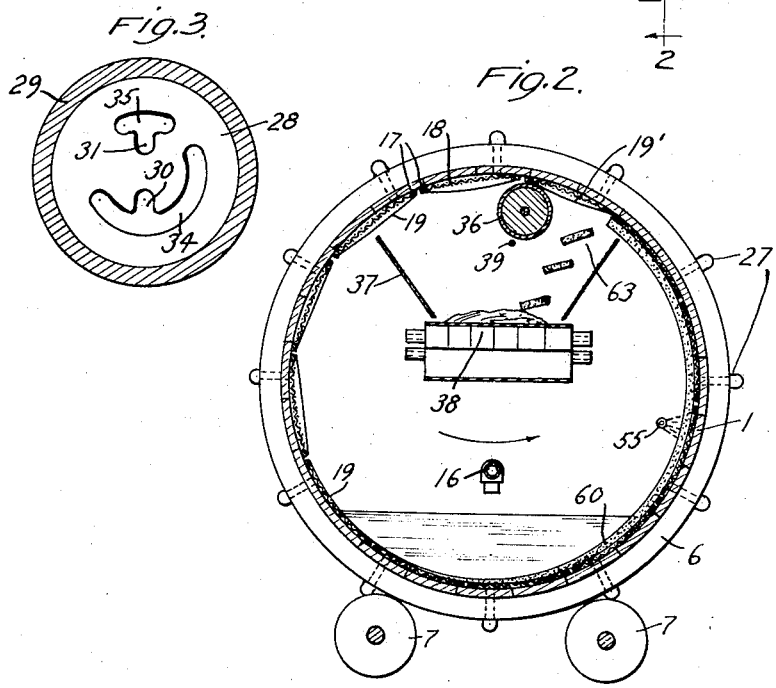
INVENTOR.
John T. Shimmin
BY Arthur P. Knight
ATTORNEY.

April 1, 1930.   J. T. SHIMMIN   1,752,758
APPARATUS FOR SEPARATING SOLIDS FROM
LIQUIDS OR LIQUORS BY FILTRATION
Filed May 4, 1925   4 Sheets-Sheet 2
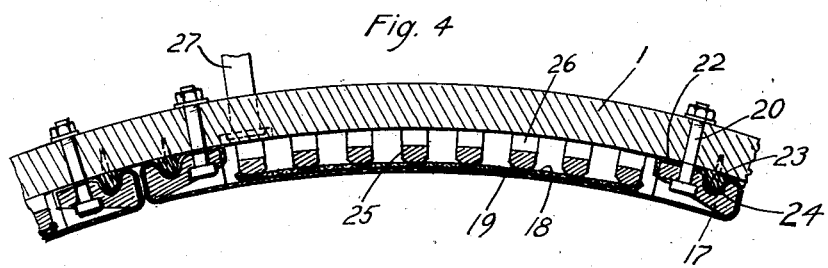
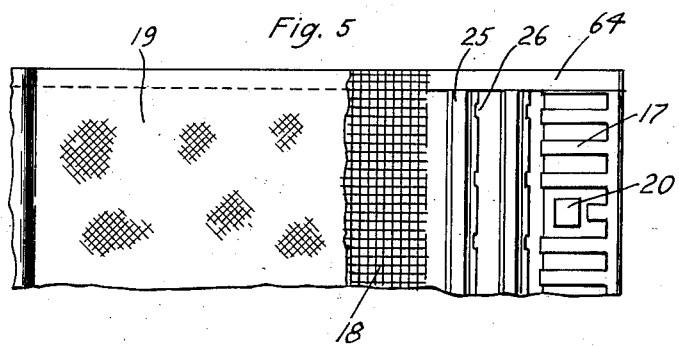
INVENTOR.
John T. Shimmin
BY Arthur P. Knight
ATTORNEY.

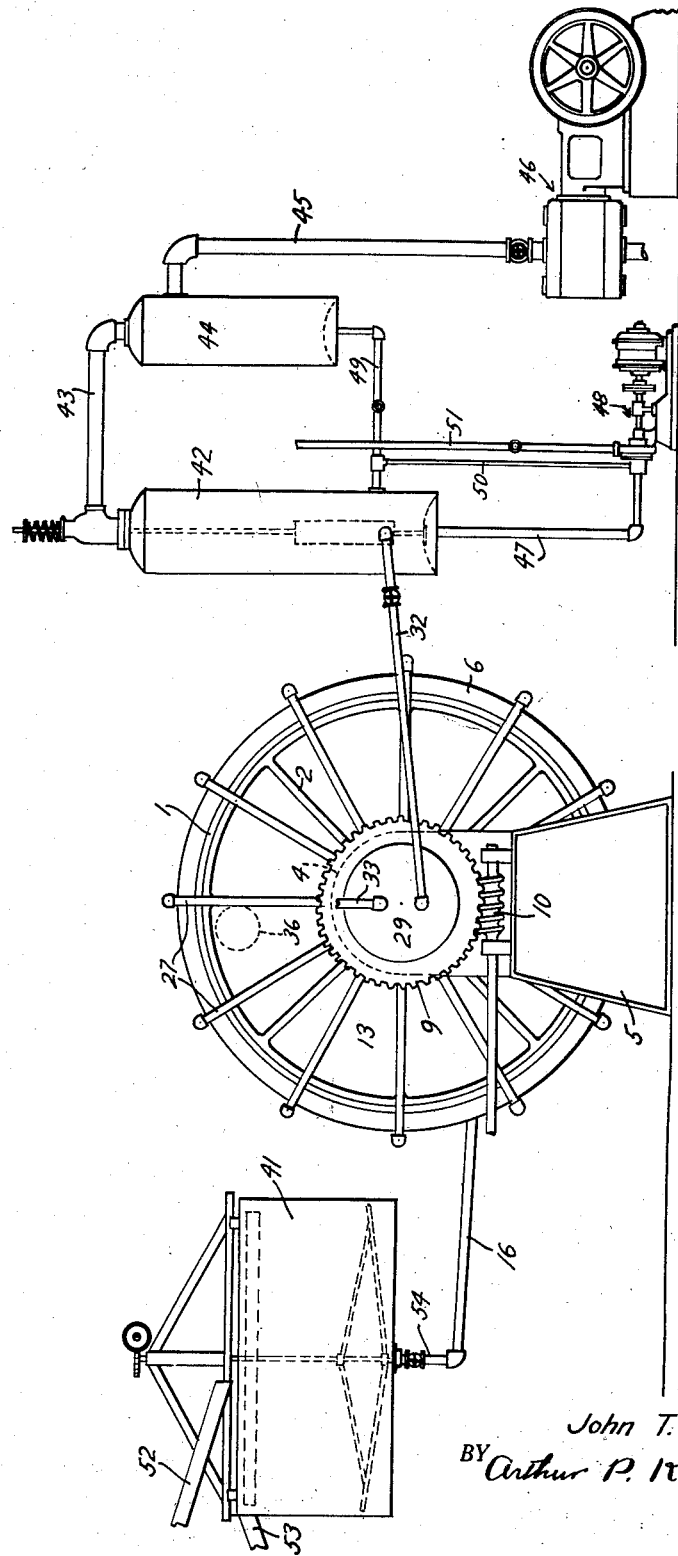

April 1, 1930.　　　　J. T. SHIMMIN　　　　1,752,758
APPARATUS FOR SEPARATING SOLIDS FROM
LIQUIDS OR LIQUORS BY FILTRATION
Filed May 4, 1925　　　4 Sheets-Sheet 4
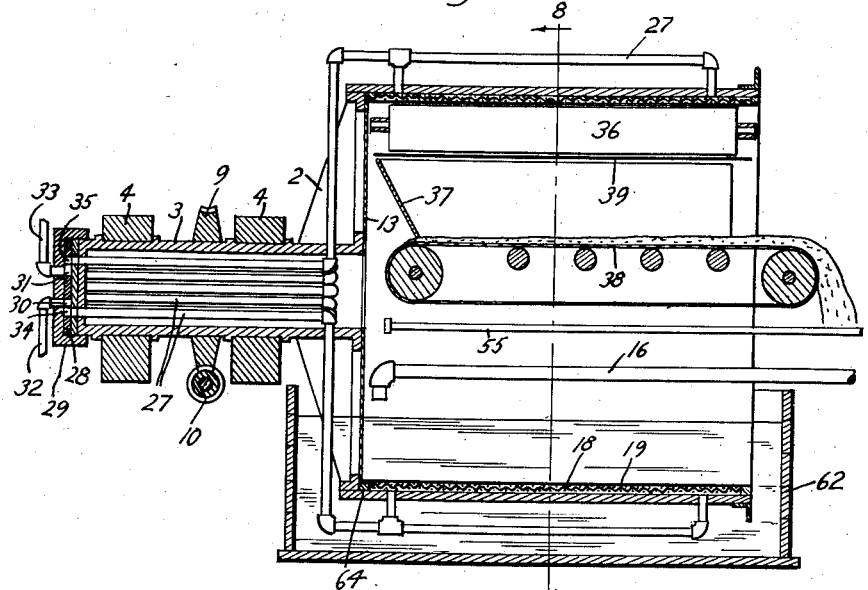
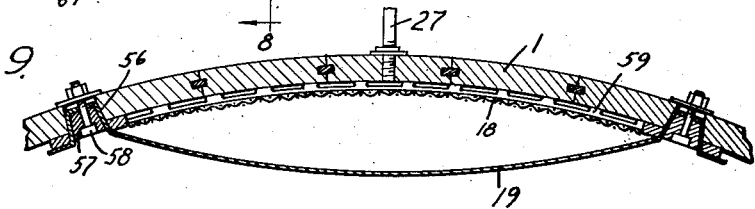
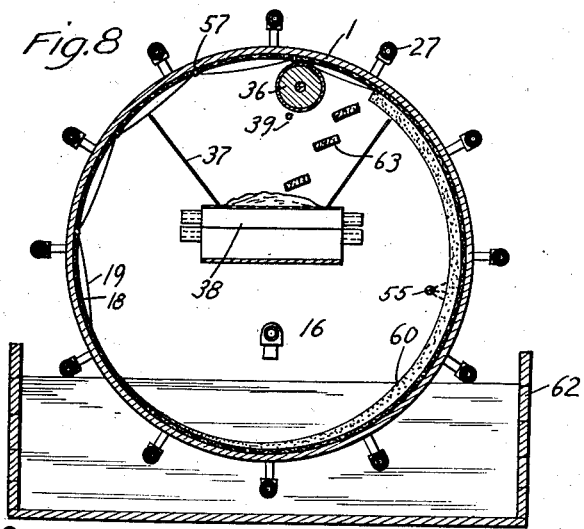
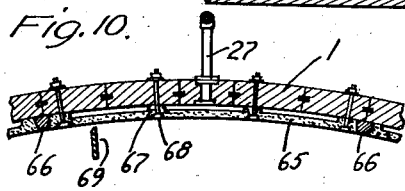
INVENTOR.
John T. Shimmin
BY Arthur P. Knight
ATTORNEY.

Patented Apr. 1, 1930

1,752,758

UNITED STATES PATENT OFFICE

JOHN T. SHIMMIN, OF HURLEY, NEW MEXICO

APPARATUS FOR SEPARATING SOLIDS FROM LIQUIDS OR LIQUORS BY FILTRATION

Application filed May 4, 1925. Serial No. 27,804. REISSUED

My invention relates to an apparatus for separating solids from liquids or liquors by filtration, and particularly relates to the type of apparatus generally known as a continuous drum or leaf type of vacuum filter. In this type of apparatus a pulp containing liquid and solids is contained in a tank. Cells, panels or leaves covered with a filtering medium are brought into contact with the pulp and vacuum applied to them. This causes the liquid or liquor to pass through the filtering medium while the solids are retained thereon. The cell, panel, or leaf is removed from the pulp after a time and the solids may be removed by a scraper or other means. The operation is continuous as a number of cells, panels or leaves are used, one following the other, and each in turn is connected to a source of vacuum.
The main object of my invention is to provide an apparatus whereby the operations mentioned may be performed in a more advantageous manner, as will be hereinafter more fully described, and particularly to provide a continuous filter in which the action of gravity is utilized to asist the action of the vacuum in the separation of the solids from the pulp. The invention comprises a rotary filter shell or carrier provided with interior filter members, the liquid to be filtered being supplied above and in contact with said filter members so as to cause solids to settle from the liquid onto the filter members, the liquid passing through the filter members by the action of vacuum apparatus. This feature of my invention expedites the filtration and permits of formation of a relatively thick filter cake without retarding the filtration, by reason of the coarse solids settling against the filtering medium and the fine solids settling over the coarse solids. Another advantage of this mode of operation in which the liquid is supplied above the filtering medium is that no agitation is required for holding the solids in suspension so as to bring them in contact with the filtering medium, as in my invention, the natural tendency of the solids to settle is utilized to assist the vacuum in building up a cake comprising the solids.

Another object of the invention is to facilitate the removal of the cake and solids from the filter medium by providing for bringing the filter medium, at the time of removal of solids therefrom, to a position in which the layer of solids is below the filter medium and can fall freely therefrom, and by providing for changing the curvature of the filter medium, at the time of removal of solids by application of air or steam pressure thereto, so as to loosen the material from the filter medium.

The accompanying drawings illustrate embodiments of my invention and referring thereto:

Fig. 1 is a longitudinal vertical section of one form of the continuous filter.

Fig. 2 is a section on line 2—2 in Fig. 1.

Fig. 3 is a section on line 3—3 in Fig. 1.

Fig. 4 is a sectional view of a portion of the peripheral wall of the rotary drum of the filter shown in Figs. 1 and 2 showing one means of attaching the filter medium thereto.

Fig. 5 is an inverted plan view of the parts shown in Fig. 4.

Fig. 6 is a diagrammatic elevation of a filtering installation showing the supply and delivery connections for the continuous filter.

Fig. 7 is a longitudinal vertical section of another form of my invention.

Fig. 8 is a section on line 8—8 in Fig. 7.

Fig. 9 is an enlarged sectional view of a portion of the peripheral wall of the rotary drum of the filter shown in Figs. 7 and 8, showing a different means of attaching the filtering medium.

Fig. 10 is a sectional view through the peripheral wall of the drum, showing the application of a permanent rigid filter medium thereto.

The form of my invention shown in Figs. 1 to 6 comprises a rotary drum or carrier member 1 formed of wooden staves, suitably bound together, or of sheet metal, or other suitable construction, said drum being open at one end but provided at its other end with a spider 2 which is mounted or carried on a hollow shaft 3, journaled in suitable bearings 4 on a suitable standard as shown at 5 in Fig. 6. Another bearing for the drum may be provided for example at or near the open end thereof, consisting of a track ring 6 extending around and secured to said drum and running on rolls 7 which are journaled on suitable supporting means. Means are provided for driving the drum to slowly rotate the same, said means consisting for example of a worm wheel 9 on the shaft 3 and a worm 10 engaging said worm wheel and driven by any suitable means. The drum 1 is provided at its open end with an inwardly extended flange 12 which in connection with the peripheral wall of the drum and with a closed wall 13 at the opposite end of the drum forms a tank or receptacle at the lower part of the drum for receiving the pulp or material to be filtered; said flange having, if desired, an overflow cone or spill-way 14 over which any excess of material supplied may pass to a suitable launder 15.

Any suitable means may be provided for supplying the liquid to be filtered to the interior of the drum, for example a pipe 16 extending into the drum through the open end thereof and discharging into the liquid or pulp receptacle formed in the lower portion of the drum as aforesaid.

The impervious wall 1 of the drum is provided on the inside thereof with means forming filter-cells, chambers or leaves. For this purpose there are provided at said inner wall, frame means 17, supporting screens 18, and filter members 19 extending interiorly of said screen and secured to the said frame means so as to form a plurality of filter cells or chambers between the respective filter members 19 and the peripheral wall 1 of the filter. Each frame 17 may be secured to said wall 1 by bolts or other fastening means 20 and the filter member may consist of a suitable pervious filter medium and preferably a flexible material such as canvas or other pervious fabric which is stretched over said frame and is secured thereto by suitable clamping means for example by clamping the fabric between frame 17 and the wall 1 of the drum as indicated at 22. The filter medium may be further held by strips 23 on the wall 1, bending the fabric into grooves 24 in the frame 17. The screen 18 may be secured to and spaced from the wall 1 by means of slats or strips 25 which are fastened to said wall and are slotted as shown at 26 to permit free access of liquid between said strips. It will be understood that the purpose of the screen 18 is to provide a suitable support for the filter medium when it is pressed outwardly by the action of the suction or vacuum as hereinafter described and for this purpose the said screen is preferably formed so as to be concentric with the wall 1 of the rotary filter. Screens 18 and filter members 19 may be secured in any suitable manner at their ends to supporting or retaining strips 64 which extend around and are secured to the inside of drum 1, or said strips 64 may be attached to and form a part of the frames 17 as shown in Fig. 5.

A pipe 27 extends through the wall 1 and leads to an air valve 28 at one end of the rotary shaft 3. Said pipe is shown as having two connections to the corresponding filter cell or chamber and in general there will be one such pipe for each cell of the chamber, the purpose of this pipe connection being to enable liquid and air to be withdrawn from said cell or chamber, and compressed air or steam to be supplied thereto as may be required in the operation as hereinafter set forth. In order to facilitate the drainage of liquid from the filtering cell or panel each pipe 27 is connected to the corresponding filtering cell adjacent the rearward edge thereof with respect to the direction of rotation of the filter. By making the connections in this manner the liquid is removed from the lowermost portion of the cell as it rises out of the body of liquid in the filter and complete drainage is thus ensured. The fact that pipes 27 are connected through the periphery of the shell and thus enter the respective filter cells substantially radially and from the outside also facilitates the drainage of liquid from the cells, for by means of such an arrangement each pipe 27 is below the cell to which it is connected when such cell is rising out of the body of liquid in the filter. The manner of connecting pipes 27 to the filtering cells or panels is therefore such as to utilize the action of gravity to the fullest possible extent to assist the vacuum in removing the liquid from such cells or panels. In the embodiment of my invention shown in the drawings the same control valve is used both in the suction and pressure stages of the operation and in such embodiment the control valve 28 may consist of a stationary valve plate held in fixed position within a fitting 29 at the outer end of the shaft 3, and being provided with a vacuum chamber 30 and with a pressure chamber 31 communicating respectively with vacuum pipe 32 and pressure pipe 33 and also being provided with an aperture 34 communicating with the said vacuum chamber and an aperture 35 communicating with said pressure chamber. Suitable means are provided for maintaining a gas tight fit between the fitting 29, valve plate 28, and the shaft 3 in the rotation of the latter and the respective pipes 27 are provided with ports, formed for example by the ends of said pipes, which are adapted to register with the respective openings 34 and 35 in the rotation of the shaft 3 for the purposes hereinafter set forth. Suitable means such as perforated pipe 55, may be provided for introducing water or other medium for spraying, washing or otherwise treating the cake.

A stripper roll 36 may be provided within the filter drum, said roll being mounted on a suitable stationary support and being adapted to contact with the respective filter members 19 in the rotation of the drum to assist in removing solid material or cake from the drum and if necessary a stripper wire or blade 39 may be provided for said roll. A hopper 37 is mounted in fixed position within the drum to receive the material dislodged from the filter members and to deliver the same to a suitable conveyor or delivery means indicated at 38.

My improved filtering apparatus may be used with any suitable means for supplying liquor or liquid thereto; for removing the products of filtration, and for maintaining the vacuum and pressure connections to the apparatus. For example as shown in Fig. 6 the supply pipe 16 for the filter drum may lead from a thickener 41 of any well-known type so as to supply to said pipe 16 a liquid which contains a relatively large proportion of solids and is in suitable condition for filtration. The vacuum pipe 32 from the control valve leads to a receiver 42 which is shown as connected by a pipe 43 to a moisture trap 44 from which a pipe 45 leads to a dry vacuum pump 46. A pipe connection 47 is provided from the lower part of the tank 42 to remove liquid therefrom, said pipe leading to a pump 48 for drawing off such liquid; or in case a sufficiently low point of discharge is available, said pipe 47 may lead downwardly to a suitable trap located say 30 feet below the bottom of tank 42 so as to draw the liquid therefrom by gravity while maintaining the vacuum within said tank. Suitable pipe connections 49 and 50 may be provided for drawing moisture from trap 44 back to tank 42 or to pump 48. The outlet or discharge pipe 51 of pump 48 may lead to a solution tank for receiving the liquid, for example for reuse. The pressure pipe 33 may lead to any suitable means for supplying the desired fluid pressure.

The operation of the apparatus above described is as follows:

Pulp usually containing one half of one per cent to fifty per cent solids, is delivered to thickener 41 through pulp feed launder 52. Clear liquid leaves thickener through clear overflow launder 53. Thickened material containing five per cent to eighty-five per cent solids leaves the bottom of thickener through pipe 54, and this pulp enters the tank or receptacle formed at the lower part of the filter drum through pipe 16. The filter drum 1 with filtering medium 19 at the inner wall of its periphery rotates slowly in the direction indicated by the arrow. The larger and heavier particles quickly settle against filtering medium 19 on the inner face of the cells, panels, or leaves at the lower portion of the drum. Vacuum connection to the exterior of any filter cell or leaf, is maintained through pipe 27 and valve port 34, while the said cell or leaf is immersed in the pulp or liquid, and the resulting suction removes liquid or liquor as fast as same passes into the cell, panel or leaf, and a layer or cake of solids indicated at 60 builds up thereon. Such vacuum connection is also maintained to each cell or leaf after it passes out of the pulp and under spray means 55 which may be used to wash or otherwise treat the filter cake. The vacuum connection is also maintained after passing spray means 55, for a sufficient period to draw the greater part of the liquid out of the cake and dry it sufficiently for discharge. When the cell, panel, or leaf is beyond the edge of hopper 37, vacuum is released by valve 28, and compressed air applied. This releases the filter cake from the filter surface or medium, and if desired, the filtering medium may be allowed under the action of such pressure, assisted by gravity, to assume the position as shown at 19' in Fig. 2, permitting the cake to fall off as indicated at 63 and to drop to conveyor 38. It should be noted that the change in curvature thus produced in the filter medium and hence in the cake of solids which may actually be made to amount to a change from concave curvature to convex curvature, tends to break up the cake and assists materially in dislodging the same from the filter medium. In case the filter cake does not separate from the filtering medium readily it will adhere to roller 36 as it passes over it and can be separated from the roller 36 by cutting wire 39. The filter cake collects on conveyor 38 and is carried away to any suitable receiving means.

Various modifications may be made in the apparatus as above described, for example, as shown in Figs. 7 to 9 the receptacle for the pulp, liquid, or liquor to be filtered may consist of a tank 62 surrounding the lower portion of the filter drum, one end of the filter drum being entirely open as shown so as to permit free entrance of the liquid into the lower part of the filter drum and above the filtering medium upon the inside of said drum. With such a construction, in which the outside of the filter drum is immersed in the liquid or pulp to be filtered it is desirable to provide for mounting the filter drum at one end only and for this purpose two bearings indicated at 4 are provided at one end of the drum the shaft 3 from the drum being journalled in both of said bearings which are of such construction as to provide for supporting the drum from one end only. In other respects the construction may be substantially as above described. I have shown in Fig. 9 however a different method of mounting the filter medium on the inside of the drum, the wall 1 of the drum being provided with recesses or grooves 56 which are tapered as shown so as to permit the filter medium or member to be clamped in said grooves by means of wedges 57 secured in position by bolts 58. In Figs. 7 to 9 the filter medium 19 is shown as a continuous member of fabric which is placed in position within the drum, being for example unwound from a roll of material and secured at successive points by means of respective clamping strips or wedges 57, the drum being turned after each fastening operation sufficiently to unwind enough material for another section of the filter medium which is then fastened by the next clamp strip or wedge and so on until completion of one rotation of the drum. The filter medium will then have been placed entirely around the inside of the drum, the filtering material being then cut off, the next clamping strip or wedge which is put in position serving to fasten both ends of the filtering medium. To separate or space the filter medium from the inside of the filter drum any suitable spacing means may be used for example notched frames or strips as indicated at 59 in Fig. 9, and suitable means, such as screens 18, may also be provided for the filter medium in this case. Said screens and filter medium 19 may as before be secured at their ends to strips 64.

It will be understood that any suitable means may be provided for securing the filtering medium in place and particularly the means shown in Figs. 4 and 5 or the means shown in Fig. 9 may be used with either form of filter drum shown in Figs. 1 to 3 or in Figs. 7 and 8.

It is not essential that a flexible filter medium such as a fabric be used in connection with my invention and in some cases I may use a permanent, rigid filter medium of pervious material, such as concrete or other porous cast, molded, or burned composition. For example, as shown in Fig. 10, the filtering medium may be formed of a plurality of segmental slabs or plates 65 formed of such concrete or other porous material, placed between bars or strips 66 extending lengthwise of the drum. Said filter slabs may be provided with lugs or projections 67 for spacing the same from the interior of the wooden shell 1, and may be secured to such shell by means of bolts 68. In this case I have shown a scraper 69, which may be of metal, for assisting in removing the cake from the filtering medium at the upper part of the drum, but it will be understood that any suitable means may be employed for removing the cake from the filtering medium in this case as well as when a flexible filtering medium is employed. In particular, either a stripping roll or a scraper of metal or other material may be used in any case for assisting in cleaning the filtering medium.

The remainder of the construction and the operation are substantially the same in this case as with the forms above described, with the exception that the curvature of the filtering medium is not changed upon application of fluid pressure to the exterior thereof, but such fluid pressure simply dislodges or loosens the cake from the filtering medium.

While I have illustrated the rotatably mounted carrier or container for the filtering medium as comprising a cylindrical drum, it is obvious that any suitably shaped shell or casing may be used for this purpose. For example, said carrier may comprise a rotatably mounted hexagonal, octagonal, or other similarly shaped shell or casing instead of a cylindrical shell, said shell or casing being provided interiorly with a filtering medium, and being provided with suitable supporting means, such as a circular track ring as in the form shown in Fig. 1, or a double bearing at one end as in Fig. 7. In such case the filtering medium itself may be cylindrical, or it may conform to the shape of the shell, there being for example one or more filter cells, panels, or frames mounted within each side of the shell.

I claim:

1. In filtering apparatus, a filtering element comprising a support having a recessed concave face, a filtering medium extending across and normally spaced from said face, and casing means cooperating with the support to form a closed cell, said concave face being provided with means for supporting and maintaining the filtering medium in a smooth concave curve when external pressure is applied to the filtering medium.

2. Filtering apparatus comprising a drum mounted for rotation about a horizontal axis, a plurality of filter sections located on the inner longitudinal surface of the drum in series, each section including a concave face and a flexible filter medium movable relatively thereto and adapted to be seated against the face by excess of pressure within the drum; and means for creating an excess of fluid pressure on the filtrate side of the filter medium in each section successively to force the filtering medium away from the supporting surface and into a convex position for discharge of solids therefrom.

3. Filtering apparatus comprising a drum mounted for rotation about a horizontal axis, a series of separate filter sections located on the longitudinal inner face of the drum, each section comprising a supporting surface and a filtering medium free to move relative thereto, and means for applying fluid pressure successively to the filter sections during the upper part of their travel to move the filtering medium away from the support and discharge therefrom solids which collect thereon.

4. In filtering apparatus, a drum mounted for rotation about a horizontal axis, filter means for collecting a cake of solids on the inner longitudinal face of the drum, and cakecrushing means for detaching such solids from the face of the drum at the upper part thereof, said means including a longitudinal roller in the path of the layer of solids.

5. In filtering apparatus a filter comprising a horizontal rotary cylinder, a plurality of filtering units on the inner face of the cylinder, means for applying filtering suction to each unit and means for removing filtered solids from the drum, each filtering unit including a frame removably mounted on the inner face of the drum and a sheet of filtering material covering a face of the frame.

In testimony whereof I have hereunto subscribed my name this 25th day of April, 1925.

JOHN T. SHIMMIN.